United States Patent Office 3,483,175
Patented Dec. 9, 1969

3,483,175
POLYMERS CONTAINING BETA-HALO-
ISOCYANATE GROUPS
James L. Harper, Laurel, and David A. Daniels, Baltimore, Md., assignors to W. R. Grace & Co., New York, N.Y., a corporation of Connecticut
No Drawing. Filed Jan. 5, 1968, Ser. No. 695,846
Int. Cl. C08f 27/08; C08d 5/02
U.S. Cl. 260—85.1                    10 Claims

ABSTRACT OF THE DISCLOSURE

A substituted polyolefin is formed by reacting a homopolymer or copolymer of a conjugated diene with isocyanic acid and tertiary butyl hypohalite to change the ethylenically unsaturated groups of the polymer to the beta-haloisocyanato groups. The resulting polymers are curable with conventional isocyanate curing agents.

---

The present invention relates to a novel and useful polymer and to a process for its preparation. More particularly, it relates to a polymer of a diene which contains beta-haloisocyanato groups.

Isocyanates are quite reactive compounds and have achieved considerable use as intermediates in the formation of other organic compounds including polymers. In general, such compounds are quite expensive which somewhat limits their use. It is an object of the present invention to form polymers containing a beta-haloisocyanate group which are readily curable. Another object is to prepare such polymers in a relatively simple and inexpensive manner. Another object is to provide polymer compositions which will cure at room temperature with various materials. Other objects will become apparent as the description of the invention proceeds.

These objects are accomplished by the present invention which provides a substituted polyolefin wherein a polymer is formed by the reaction of a conjugated diene and a material selected from the group consisting of an olefin and a diene to give a polymer having a molecular weight of at least 5,000 and containing at least two ethylenically unsaturated groups

and wherein at least two of the said ethylenically unsaturated groups of the said polymer have been changed to the beta-haloisocyanato groups of the formula

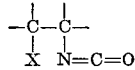

wherein X is halogen.

In a preferred embodiment of the present invention, the diene is butadiene which is reacted with styrene to give a copolymer having a molecular weight of from about 7,000 to about 20,000, more preferably from about 8,000 to about 12,000.

The present invention also provides a process for forming a substituted polyolefin which comprises reacting (A) one molar proportion of a polyolefin having a molecular weight of at least 5,000 and formed by the reaction of a conjugated diene and a material selected from the group consisting of an olefin and a diene to give a polymer containing at least two ethylenically unsaturated groups

with (B) at least about 2 molar proportions of isocyanic acid and (C) at least about 2 molar proportions of tertiary butyl hypohalite at a temperature below about 30° C. and thereafter recovering the substituted polyolefin. While any tertiary butyl hypohalite may be used in the present invention, the halogen is preferably chlorine or bromine.

In a preferred embodiment of the present invention the reaction is carried out at a temperature below 0° C. and more preferably at a temperature below —30° C.

The "conjugated diene" which may be used in the practice of the invention is any compound having the group

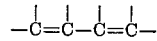

Among the various dienes which may be used are 1,3-butadiene, 1,3-pentadiene, 2,4-hexadiene, 1-phenyl-1,3-butadiene, and the like. Such compounds are well known in the art and are widely used in the formation of addition polymers. The terms "olefin" and "diene" are used to signify monomers which form copolymers with the conjugated diene. The monomers may be conjugated, non-conjugated or contain a single ethylene group. Such materials include propylene, 1-butene, 1-pentene, 2-pentene, 1-hexene, 9-hexadecene, 4-methyl-1-butene, 4-ethyl-1-cyclohexene, styrene, 1-(2-tolylbutyl)-1-hexene, 1,4-butadiene, 1,4-pentadiene, 1,3-butadiene and the like. Other materials as the common animal and vegetable oils as well as the terpenes may also be used to form the copolymers.

The following examples are given to illustrate the invention and are not intended to limit it in any manner. All parts are given in parts by weight unless otherwise expressed.

EXAMPLE 1

A 4-neck flask is equipped with a magnetic stirrer, a nitrogen inlet, a nitrogen outlet and a dropping funnel. 25.5 grams (about 3 millimoles) of a 80/20 butadiene/styrene copolymer having an average molecular weight of 8,000 to 10,000 and containing an average of 9–12 ethylene groups per molecule is dissolved in 510 g. of chloroform and placed in the flask. To the flask is then added 596 millimoles of isocyanic acid in 240 grams of chloroform. The clear solution is cooled to —65° C. by the use of Dry Ice in acetone. By the use of the dropping funnel 298 millimoles of tertiary butyl hypochlorite is added dropwise over a 2-hour period. The reaction is exothermic and the mixture is maintained between —55° C. and —60° C. during the 2-hour period. The mixture is then cooled to —73° C. and stirred for 1 hour. The excess isocyanic acid is stripped off at 2 mm. Hg at —60° C. A portion of the polymer in solution is cast as a film on a glass plate to cure overnight from the moisture in the air.

The cast film is extremely hard, glossy, cloudy and could not be separated from the glass plate. Analysis for —NCO groups show that essentially all of the ethylene groups have been replaced by —NCO groups. The cast film could not be redissolved in chloroform.

To 100 grams of the polymer solution is added 0.25 gram of 1,3-propane diamine. The solution is cast on glass plate to cure exothermally. The film is very similar to the one cured by moisture.

EXAMPLE 2

A 4-neck flask is equipped with a magnetic stirrer, a nitrogen inlet and a nitrogen outlet and a dropping funnel. 50 grams (about 0.017 mole) of a polyisoprene homopolymer having an average molecular weight of 2,800,000 and containing an average of about 40,000 ethylene groups per molecule is dissolved in 320 g. of chloroform and placed in the flask. To the flask is then added 416 millimoles of isocyanic acid in 480 grams of chloroform. The clear solution is cooled to —65° C. by the use of Dry Ice in acetone. By the use of the dropping funnel 277 millimoles of tertiary butyl hypochlorite is added dropwise over a 2-hour period. The reaction is exothermic and the mixture is maintained between −55° C. and −60° C. during the 2-hour period. The excess isocyanic acid is stripped off at a mm. Hg at −60° C. A portion of the polymer in solution in cast as a film on a glass plate to cure over-night from the moisture in the air.

The cast film is tough, glossy, cloudy and could not be separated from the glass plate. Analysis for —NCO groups show that 50% of the ethylene groups have been replaced by —NCO groups.

EXAMPLE 3

A 4-neck is equipped with a magnetic stirrer, a nitrogen inlet, a nitrogen outlet and a dropping funnel. 50 grams (about 1 millimole) of a 1/1 butadiene/styrene copolymer having an average molecular weight of 50,000 and containing an average of about 316 ethylene groups per molecule is dissolved in 275 grams of chloroform and placed in the flask. To the flask is then added 500 millimoles of isocyanic acid in 480 grams of chloroform. The clear solution is cooled to −65° C. by the use of Dry Ice in acetone. By the use of the dropping funnel 333 millimoles of tertiary butyl hypochlorite is added dropwise over a 2-hour period. The reaction is exothermic and the mixture is maintained between −55° C. and −60° C. during the 2-hour period. The excess isocyanic acid is stripped off at 2 mm. Hg at −60° C. A portion of the polymer in solution is cast as a film on a glass plate to cure overnight from the moisture in the air.

The cast film is very tough, glossy and cloudy but the film could be removed from the glass plate as a pliable film. Analysis for —NCO groups show that most of the ethylene groups have been replaced by —NCO groups.

EXAMPLE 4

A 4-neck flask is equipped with a magnetic stirrer, a nitrogen inlet, a nitrogen outlet and a dropping funnel. 50 grams (about 7 millimoles) of a 83/17 butadiene/isobutylene copolymer having an average molecular weight of about 6,000 and containing an average of 91 ethylene groups per molecule is dissolved in 510 grams of chloroform and placed in the flask. To the flask is then added 250 millimoles of isocyanic acid in 240 grams of chloroform. The clear solution is cooled to −65° C. by the use of Dry Ice in acetone. By the use of the dropping funnel 125 millimoles of tertiary butyl hypochloride is added dropwise over a 2-hour period. The reaction is exothermic and the mixture is maintained between −55° C. and −60° C. during the 2-hour period. The excess isocyanic acid is stripped off at 2 mm. Hg at −60° C. A portion of the polymer in solution is cast as a film on a glass plate to cure overnight from the moisture in the air.

The cast film is extremely hard, glossy, cloudy and could not be separated from the glass plate. Analysis for —NCO groups show that about 80 of the ethylene groups have been replaced by —NCO groups.

EXAMPLE 5

The procedure of Example 4 is repeated employing a 83/17 butadiene/isobutylene copolymer having an average molecular weight of about 10,000 and containing an average of 150 ethylene groups per molecule. The polymer is cast as in Example 4.

The cast film is quite tough, glossy, cloudy but could be quite easily scratched. Analysis for —NCO groups shows that about 140 of the ethylene groups have been replaced by —NCO groups.

EXAMPLE 6

The procedure of Example 1 is repeated employing 298 millimoles of tertiary butyl hypobromite instead of the 298 millimoles of tertiary butyl hypochlorite. The polymer is cast from the filtrate as in Example 1.

The cast film has essentially the same properties as the polymer of Example 1.

While in the above examples unmodified polymers are prepared, it is obvious that dyes, pigments, fillers and the like may be added to the polymers without substantial alterations of the physical properties.

The polymers of the present invention can be cured by the use of any of the conventional isocyanate curing agents such as reactive amine, hydroxyl or other groups. Preferably, the polymers are cured by the action of moisture from the air.

Many equivalent modifications will be apparent to those skilled in the art from a reading of the foregoing without a departure from the inventive concept.

What is claimed is:

1. A substituted polyolefin wherein a polymer is formed by the reaction of a conjugated diene and a material selected from the group consisting of an olefin and a diene to give a polymer having a molecular weight of at least 5,000 and containing at least two ethylenically unsaturated groups

and wherein at least two of the said ethylenically unsaturated groups of the said polymer have been changed to the beta-haloisocyanato group of the formula

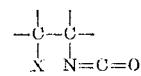

wherein X is halogen.

2. The substituted polyolefin of claim 1 wherein the said polymer has a molecular weight of from about 7,000 to about 20,000.

3. The substituted polyolefin of claim 1 wherein the said polymer has a molecular weight of from about 8,000 to about 12,000.

4. The substituted polyolefin of claim 1 wherein the conjugated diene is butadiene.

5. The substituted polyolefin of claim 4 wherein the butadiene is reacted with styrene.

6. A process for forming a substituted polyolefin which comprises reacting (A) one molar proportion of a polyolefin having a molecular weight of at least 5,000 and formed by the reaction of a conjugated diene and a material selected from the group consisting of an olefin and a diene to give a polymer containing at least two ethylenically unsaturated groups

with (B) at least about 2 molar proportions of isocyanic acid and (C) at least about 2 molar proportions of tertiary butyl hypohalite at a temperature below about 30° C. and thereafter recovering the substituted polyolefin.

7. The process of claim 6 wherein the reaction is carried out at a temperature below about 0° C.

8. The process of claim 6 wherein the reaction is carried out at a temperature below −30° C.

9. The process of claim 6 wherein the conjugated diene is butadiene.

10. The process of claim 6 wherein the polyolefin having a molecular weight of at least 5,000 is a butadiene/styrene copolymer.

References Cited

UNITED STATES PATENTS 3,402,136   9/1968   Sakuragi et al. _____ 260—23.7

JOSEPH L. SCHOFER, Primary Examiner

WILLIAM F. HAMROCK, Assistant Examiner

U.S. Cl. X.R.

260—82.1, 85.3, 94.7